United States Patent [19]
Hicks

[11] 3,908,961
[45] Sept. 30, 1975

[54] WEDGE ANCHORING DEVICE

[75] Inventor: John R. Hicks, Milwaukee, Wis.

[73] Assignee: Applied Power, Inc., Milwaukee, Wis.

[22] Filed: Sept. 9, 1974

[21] Appl. No.: 504,376

Related U.S. Application Data

[63] Continuation of Ser. No. 345,103, March 26, 1973, abandoned.

[52] U.S. Cl....... 254/51; 24/230.5 TD; 52/DIG. 11; 105/477; 280/179 A
[51] Int. Cl.²........................................ E02D 5/80
[58] Field of Search.......... 24/68 R, 68 CT, 68 CD, 24/68 TT, 68 A, 268, 25, 230.5 TD, 241 CH, 24/241 PS; 248/361 A, 361 R, 119 R; 105/369 A, 368 R, 368 T, 477; 280/179 A; 254/104, 51; 52/146, 149, DIG. 11

[56] References Cited
UNITED STATES PATENTS
1,504,285  8/1924  Taylor.......................... 105/369 A
3,679,175  7/1972  Drayton.......................... 248/361 A

FOREIGN PATENTS OR APPLICATIONS
262,726  10/1949  Switzerland.......................... 24/268

*Primary Examiner*—Paul R. Gilliam
*Assistant Examiner*—Kenneth J. Dorner
*Attorney, Agent, or Firm*—Roy E. Petherbridge; Robert L. Lindgren; Edward D. Gilhooly

[57] ABSTRACT

A wedge anchoring device for removing slack and anchoring an elongated member such as a chain which is coupled to an element. A chain coupling member for securing a portion of the chain is pivotally mounted whereby insertion of a wedge element adjacent thereto effects rotational movement of the coupling member in a manner that slack may be selectively controlled in the elongated element. The wedge device of the invention is adapted to be secured to a retention means such as an anchor pot and the like.

5 Claims, 5 Drawing Figures

U.S. Patent  Sept. 30,1975  3,908,961
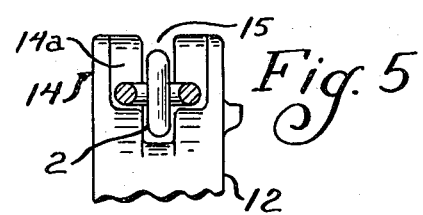
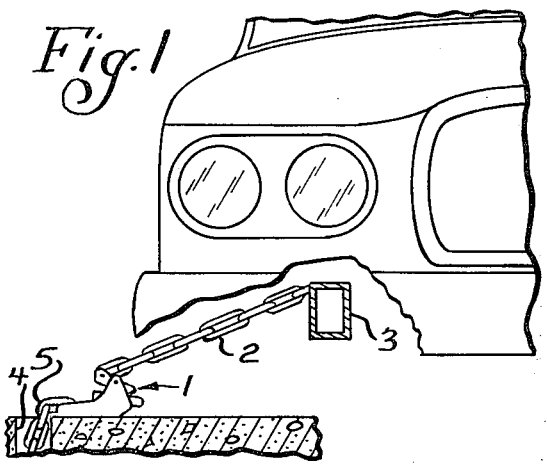
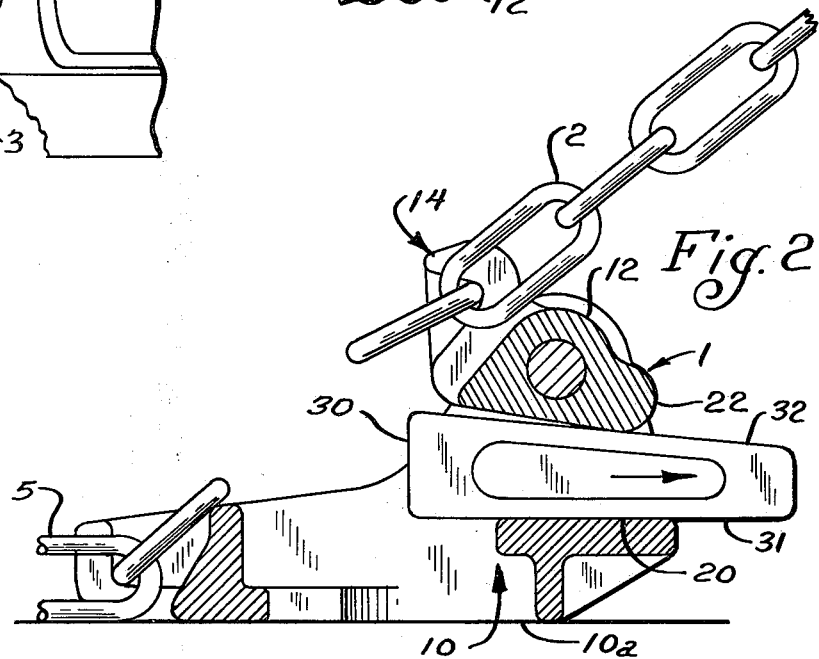
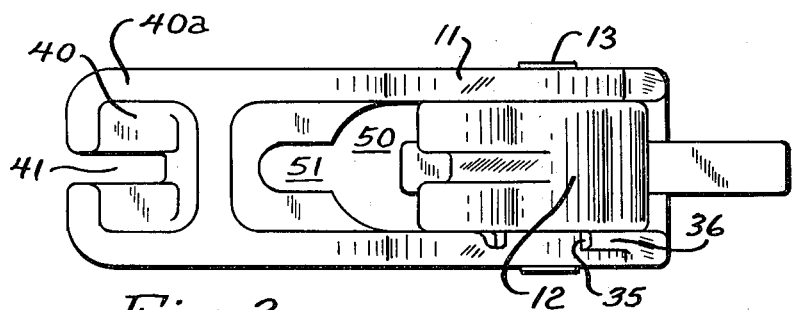
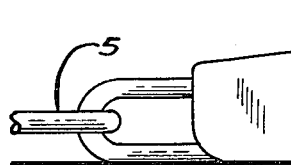
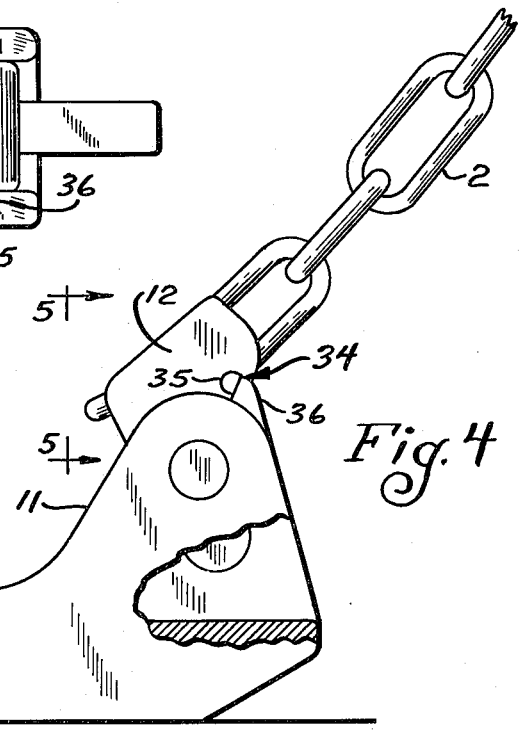

WEDGE ANCHORING DEVICE

This is a continuation of application Ser. No. 345,103, now abandoned, filed Mar. 26, 1973; For: Wedge Anchoring Device.

BACKGROUND OF THE INVENTION

This invention relates in general to a retention device and, in particular, to an improved wedge anchoring device for securing elongated members.

More specifically, the invention relates to a wedge anchoring device having means to retain an elongated element, particularly a chain, which is attached at its opposite end to an object. The anchoring device includes means to rotate the chain retention means in a manner that slack of the elongated element can be removed or otherwise controlled. After use, any degree of slack can be added to the chain to facilitate removal from the device as desired.

Although not intended to be so limited, for convenience of illustration the wedge anchoring device of the invention is described with reference to the securement of chains and the like for use in body straightening and reforming operations. However, the device of the invention is also capable of being utilized in other application where it is desired to anchor a chain or other members and minimize or otherwise control slack.

In the straightening and reforming of vehicles or other objects, it is common practice to apply a force through a force transmitting element to the body or object for reforming and straightening. As is well-known in the art, it is necessary when applying forces to an object to retain the object in the opposite direction from the application of force for stability and for effective straightening and reforming. Usually, such retaining elements are in the form of one or more chains which are attached to a portion of the object such as the frame of the vehicle and which are anchored to a support surface in such a manner that as a force is applied, the vehicle is retained in position.

In the use of prior art straightening systems, a potentially serious problem is encountered when using the prior art technique of extending a retention chain from the object to an anchoring point on the floor. Because of the nature of an elongated element such as a chain, it is virtually impossible to remove by hand or tools slack when securing it to both the object and to the anchoring point. The existence of a degree of slack in the retention chain can result in considerable movement of the object initially as a force is applied thereto. Generally, in straightening or reforming operations, the vehicle is placed upon stands and if too much slack is present in the retention chain, the initial force applied by the force applying means in the opposite direction can cause detrimental unbalancing of the object on the supports. Therefore, it is desirable to provide an inexpensive and effective device which effectively controls the amount of the slack within a retention chain prior to the application of force for a straightening or reforming operation.

SUMMARY OF THE INVENTION

It is, therefore, an object of this invention to improve the straightening and reforming of objects.

Another object of this invention is to improve the anchoring of an elongated element.

A further object of this invention is to effectively control slack of an elongated element extending between two points.

These and other objects are attained in accordance with the present invention wherein there is provided an improved wedge anchoring device which is coupled to an elongated member such as a chain in a manner that after coupling any slack existing in the member can be effectively reduced or eliminated. The device includes a securement element which contacts one portion of the chain which is coupled to an object. The securement means of the device can undergo relative movement in a manner that slack can be reduced or controlled in a simplified and inexpensive manner. The wedge anchoring device of the invention permits the retention chain to be in a taut condition before a straightening or reforming force is applied to the object so that detrimental movement of the object is virtually impossible. Moreover, the device is capable of reducing the tautness of the chain after being tightened to permit convenient removal.

BRIEF DESCRIPTION OF THE DRAWINGS

Further objects of the invention, together with additional features contributing thereto and advantages accruing therefrom, will be apparent from the following description of an embodiment of the invention when read in conjunction with the accompanying drawings, wherein:

FIG. 1 is a schematic side illustration of the wedge anchoring device of the invention in operative position in connection with a chain;

FIG. 2 is a sectional side view of the wedge anchoring device of the invention;

FIG. 3 is a top schematic illustration of the wedge anchoring device of FIG. 2;

FIG. 4 is a side schematic illustration with parts broken away of the wedge anchoring device of FIG. 2; and, FIG. 5 is an end schematic view taken along line 5—5 of FIG. 4.

DESCRIPTION OF THE PREFERRED EMBODIMENT

Referring now to FIG. 1 there is illustrated the wedge anchoring device of the invention in operative position anchoring an end of a retention chain coupled to a vehicle. As stated previously, although the wedge anchoring device has numerous applications for securing and anchoring an elongated element, for convenience of illustration the device is shown anchoring an end of a chain which is utilized to retain a vehicle during a straightening or reforming operation.

In FIG. 1 the wedge anchoring device 1 of the invention is shown coupled to an elongated chain 2 which is attached by any suitable means to a portion of the vehicle such as the frame shown in FIG. 1. The wedge anchoring device is coupled to the support surface upon which it rests by means of a conventional anchor pot 4 which is commonly provided in garages and other repair facilities. Anchor pot 4 generally includes a short length of chain 5 which can be extended outward to retain the anchor device 1 in a manner to be described in detail later. Alternatively, the wedge anchor device of the invention is capable of being retained by other conventional means such as a bolt-type anchor pot and the like.

Referring now to FIGS. 2 to 5 wedge anchoring device 1 of the invention is best illustrated. The device of the invention includes a body 10 formed of a suitable material such as metal wherein the body is formed with a pair of spaced upright walls 11 at best shown in FIGS. 3 and 4.

A chain coupler 12 in the form of a lever is pivotally mounted adjacent the top of spaced walls 11 by means of a pin 13 which extends through each of the walls. The chain engaging portion of chain coupler 12 is formed with a hook like projection 14 having a cavity 14a which is capable of receiving an individual link of a chain. The hook portion is formed with an open slot 15 to permit passage of the chain through the hook portion. As shown in FIG. 2 a chain such as a retention chain 2 coupled to a vehicle is retained by the chain coupler 12 by a link being inserted into cavity 14a in an orientation lateral of slot 15 wherein the adjacent link passes through the slot. Thus, it should be apparent that the hook portion 14 of coupler 12 is capable of retaining a chain at a point along its length adjacent any pairs of links.

Body 10 is formed with a flat horizontally disposed surface 20 which is positioned in spaced relation to coupler 12 near the bottom of upright wall 11 as best shown in FIG. 2. Coupler 12 is formed with a cam or lobe like projection 22 which is disposed opposite from projection 14 and is in direct confrontation to surface 20. The distance between the lobe portion 22 and surface 20 is sufficient to permit movement of a wedge 30 which is insertable between coupler 12 and flat surface 20 after a chain has been retained by hook 14. Wedge 30 includes a flat bottom surface 31 which is adapted to slide along planar surface 20 and an upper sloping surface 32 whereby the wedge is narrower on one end than the other.

In FIG. 2 the wedge is shown in a near complete inserted position at which time the chain 2 supported by the anchor device is in a nearly taut condition. However, initially before the insertion of wedge 30, projection 22 of the coupler is in a more downward position than is shown in FIG. 2 whereby the chain can be easily coupled to the hook in a rather slack condition. As best shown in FIGS. 3 and 4, a stop means 34 is provided to limit the downward position of lobe 22 wherein the stop means possesses a projection 35 on coupler 12 which is adapted to interengage with a raised projection 35 positioned on top of one of upstanding wall 11. After retaining the chain to the coupler 12, the narrow end of the wedge is inserted between coupler 12 and surface 20 with sloped top 32 confronting coupler 12. Introduction of wedge 30 effects counter-clockwise movement of coupler 22 around pivot 13 whereby the degree of rotation is dependent on the amount of insertion. As coupler 12 rotates it should be apparent that the chain moves to the left viewing FIG. 2 and such movement would reduce the amount of slack in the chain to a degree dependent on the position of wedge 30 and amount of rotation of coupler 22. The configuration of lobe portion 22 in contact with wedge 30 provides secure and safe retention of the chain in a tightened state during force applying operations.

Because of the design of coupler 12 in acting like a lever, it has been found that the insertion of the wedge into the space between surface 20 and the coupler requires very little effort and yet a relatively high degree of movement of the chain to the left results to tighten the chain to a desired condition. It should be apparent that wedge 30 can also be partially or totally withdrawn permitting rotation of the coupler in clockwise direction to add slack to the chain. Such action permits chain 2 to be easily removed from the device after use.

Referring now to FIGS. 2 to 5 the anchoring of the anchor device to the support surface is best shown. In FIG. 2 a chain 5 which is conventionally provided in a typical anchor pot 4 positioned in the floor of a garage and the like can be extended outward for a few links for attachment to anchor device 1 in a cavity 40 provided at the end of body 10. As shown in FIG. 3 cavity 40 is surrounded by side walls 40a for retention of the chain and a slot 41 is provided adjacent the cavity to permit passage of a link to the anchor pot.

An alternative means of retaining an anchor device 1 is provided in the bottom of body 10 and is best shown in FIG. 3 wherein an opening 50 having a slot 51 adjacent thereto is provided. Such a means is advantageously used when the anchor device of the invention is to be retained by a conventional bolt-like pot (not shown). The bolt of the pot can be inserted into opening 50 and slid in tightened relationship into slot 51.

In use of the device 1 of the invention it should be apparent that a chain can be readily attached to coupler 12 and by inserting wedge 30 rotation of the coupler away from the object results in substantial reduction of slack in the chain. After being tightened, the chain can be loosened by withdrawal of the wedge.

While the invention has been described with reference to one embodiment, it will be understood by those skilled in the art that various changes may be made and equivalents may be substituted for elements thereof. In addition, many modifications may be made to adapt a particular situation or material to the teachings of the invention without departing from its essential teaching.

What is claimed is:

1. An anchoring device for anchoring a portion of an elongated element coupled to an object comprising
    body means adapted to be anchored to a support surface,
    said body means including element coupling means for selective coupling to a portion of an elongated element connected to a object,
    said coupling means being mounted on said body means for relative motion thereto,
    actuating means being selectively positionable in the body means for movement relative to the element coupling means,
    said element coupling means including means responsive to movement of the actuating means to effect motion thereof in a selected direction to reduce slack of said elongated element,
    the coupling means is pivotally mounted on the body means on a pivot axis,
    the coupling means includes a retention means mounted in spaced relationship to the pivot axis of the coupling means to contact a portion of the elongated element,
    said means responsive to the actuating means is positioned on the coupling means in spaced relationship to the pivot axis,
    the actuating means includes an element being movable relative to the pivot axis to effect selective pivotal movement of the coupling means,
    the actuating means is a wedge element, and the body means includes a support surface slidably supporting the wedge element adjacent the coupling element.

2. The anchoring device of claim 1 wherein the wedge element includes a sloped surface in contact with the coupling means.

3. The anchoring device of claim 2 wherein the wedge element is adapted to be manually reciprocable on said support surface to adjust the degree of slack in the elongated element.

4. Anchoring device for anchoring a portion of an elongated element comprising body means adapted to be anchored to a support surface, said body means including coupling means for selective coupling to a portion of an elongated element and a support surface lying in spaced relation to the coupling means, said coupling means being mounted for pivotal movement on said body means, a wedge element adapted to be positioned for movement along the support surface, and said wedge element includes a surface contacting a portion of the coupling means upon movement along the support surface to apply a force to the coupling having resultant force components directed along the direction of movement of the wedge element and transverse thereto to effect selective rotation of the coupling means.

5. The anchoring device of claim 4 wherein the coupling means includes a retention means mounted in spaced relationship to the pivot axis of the coupling means to contact a portion of the elongated element.

* * * * *